United States Patent [19]

Marie et al.

[11] Patent Number: 5,458,856

[45] Date of Patent: Oct. 17, 1995

[54] APPARATUS FOR THE FORMATION OF EXCITED OR UNSTABLE GASEOUS MOLECULES AND USES OF SUCH AN APPARATUS

[75] Inventors: Bruno Marie, Maurepas; Daniel Guerin, Chelles; Christian Larquet, Guyancourt, all of France

[73] Assignee: L'Air Liquide, Societe Anonyme pour l'Etude et l'Exploitation des Procedes Georges Claude, Paris, France

[21] Appl. No.: 75,311

[22] Filed: Jun. 11, 1993

[30] Foreign Application Priority Data

Jun. 19, 1992 [FR] France ................................ 92 07486

[51] Int. Cl.$^6$ .............................. C01B 13/11; B01J 19/12
[52] U.S. Cl. ............... 422/186; 422/186.07; 422/186.11; 422/186.14; 422/907; 204/176
[58] Field of Search ........................... 422/186.07, 186, 422/186.11, 186.19, 907; 204/176

[56] References Cited

U.S. PATENT DOCUMENTS

| | | | |
|---|---|---|---|
| 974,789 | 11/1910 | Henney | 422/186.07 |
| 1,074,462 | 9/1913 | Richards | 422/186.18 |
| 4,774,062 | 9/1988 | Heinemann | 422/186.19 |
| 4,869,881 | 9/1989 | Collins | 422/186.18 |
| 4,886,645 | 12/1989 | Fischer et al. | 422/186.18 |
| 4,986,968 | 1/1991 | Hirth et al. | 422/186.19 |
| 5,002,739 | 3/1991 | Ditzler et al. | 422/186.19 |
| 5,034,198 | 7/1991 | Kaiga et al. | 422/186.07 |
| 5,147,614 | 9/1992 | Conrad | 422/186.18 |
| 5,169,606 | 12/1992 | Batchelor | 422/186.19 |

FOREIGN PATENT DOCUMENTS 0160964  11/1985  European Pat. Off. .
55-075905  6/1980  Japan .

Primary Examiner—Donald P. Walsh
Assistant Examiner—Daniel Jenkins
Attorney, Agent, or Firm—Young & Thompson

[57] ABSTRACT

Apparatus for the formation of excited or unstable gaseous molecules, comprising a tubular gas passage (5) having an axis, formed between a first electrode (1) and a dielectric tube (3) coaxial to the first electrode and supporting a second electrode (4), the electrodes being connected to a high voltage high frequency source (13). The first electrode (1) surrounds the dielectric tube (3) and comprises an elongated gas inlet (7) and outlet (8) parallel to the axis and diametrically opposed to each other on opposite sides of the dielectric tube (3). The second electrode (4) is a layer of metal applied to the internal wall of the dielectric tube (3). The second electrode (4) is formed by metallization of the internal wall of the dielectric tube (3). The gas inlet (7) and outlet (8) have a height not exceeding the radial thickness (e) of the gas passage (5). The external wall of the dielectric tube is covered with a thin layer (21) of enamel. A refrigerant such as Freon circulates within the dielectric tube (3) and the second electrode (4). Used for the production of ozone, to supply a mixed $CO_2$ laser, or for the production of atmospheres for nitriding metal, or for the production of reducing atmospheres.

11 Claims, 1 Drawing Sheet

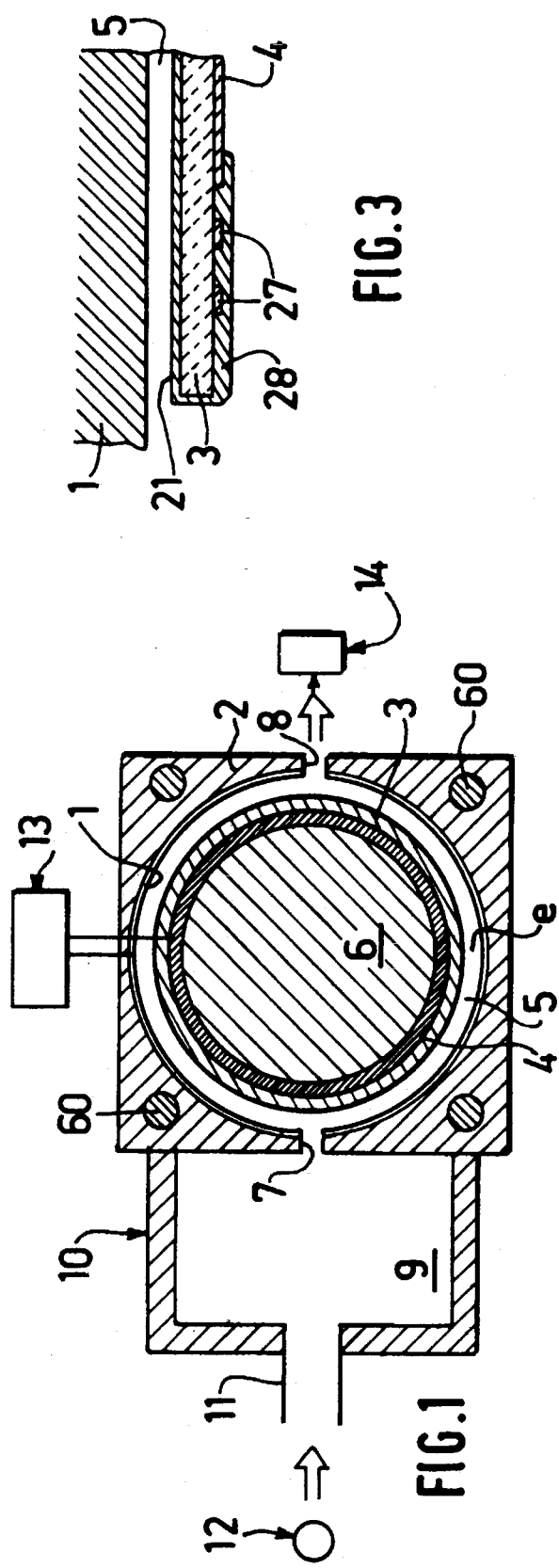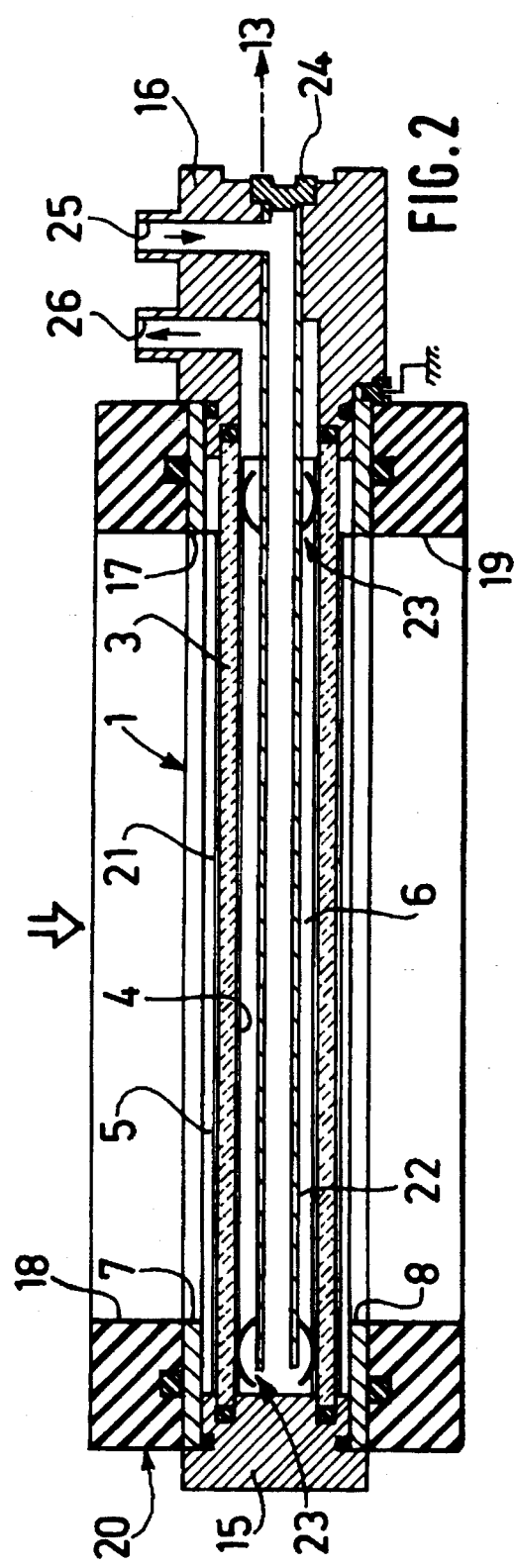

APPARATUS FOR THE FORMATION OF EXCITED OR UNSTABLE GASEOUS MOLECULES AND USES OF SUCH AN APPARATUS

The present invention relates to an apparatus for the formation of excited or unstable gaseous molecules, of the type comprising a tubular gas passage, having an axis, formed between a first electrode and a dielectric coaxial to the first electrode and associated with a second electrode, the electrodes being connected to a high voltage high frequency source.

A discharge apparatus of this type is known from the document EP-A-0 160 964 which describes an ozone generator with axial circulation of the gas to be excited in the gas passage.

The present invention has for its object to provide a new apparatus, of compact configuration, having substantially improved performances, increased reliability and adapted for numerous uses.

To do this, according to one characteristic of the invention, the first electrode surrounds the dielectric and comprises an elongated gas inlet and outlet which are parallel to the axis and substantially diametrically opposed, the second electrode being applied to the internal wall of the dielectric.

According to more particular characteristics of the invention:

the second electrode is formed by metallization of the internal wall of the dielectric whose external wall is covered with a layer of enamel;

the inlet and the outlet for the gas of the first electrode have a height not exceeding the radial thickness of the gas passage, which does not exceed 2.5 mm;

electric field limiting means are provided adjacent the axial extremities of the second electrode to avoid the formation of micro-discharges at the surface of the dielectric at its ends.

With such an arrangement of the dielectric barrier discharge type, there can be achieved, in an extremely compact volume, a "cold" electric discharge, also called, according to the authors, corona discharge or "Silent Discharge" or "Atmospheric Pressure Glow Discharge", of several kW, operating at a pressure between $0.3 \times 10^5$ Pa and $3 \times 10^5$ Pa, for example at atmospheric pressure, and having an improved output of excited species (relative to the power accumulated in the gas in the form of excited species of quanta of vibrations at the total power supplied by the apparatus) exceeding 50%, without significant heating of the gas at the outlet and adapted for multiple uses with different gases.

The present invention also has for its object the use of such an apparatus for the production of ozone, to supply a $CO_2$ mixed laser, for the production of atmospheres for the nitriding of metals or for the production of reducing atmospheres for cleaning.

Other characteristics and advantages of the present invention will become apparent from the following description of embodiments, given by way of illustration but in no way limiting, with respect to the accompanying drawings, in which:

FIG. 1 is a schematic view in transverse cross section of an apparatus according to the invention;

FIG. 2 is a longitudinal cross-sectional view of a preferred embodiment of the invention; and FIG. 3 is a detail view, on an enlarged scale, of an embodiment of one end of the dielectric according to the invention.

In the description which follows and in the drawings, identical or analogous elements have the same reference numerals.

As shown in FIG. 1, the apparatus according to the invention comprises a first tubular electrode 1, formed for example by an internal surface on a block of metal 2, and in which is disposed concentrically an assembly of a tube of dielectric material 3, for example ceramic, on the internal surface of which is deposited by metallization a second electrode 4 (exaggeratedly thick in FIG. 1 for better understanding). The assembly of dielectric 3 and the second electrode 4 thus defines, externally with the electrode 1, a tubular gas passage 5 and, internally, an internal volume 6 in which is caused to circulate a refrigerant, preferably a Freon because of its electro-negative character. The internal gas passage 5 has an axial extent less than 1 meter, typically less than 50 cm and its radial thickness e does not exceed 3 mm and is typically less than 2.5 mm.

The block 2 comprises two diametrically opposed longitudinal slots 7 and 8 forming respectively the inlet for the gas to be excited within the passage 5 and the outlet for the gas flow comprising excited or unstable molecules. The slots 7 and 8 extend over all the axial length of the cavity 5 and have a height which does not exceed the thickness e and is typically substantially identical to this latter. The body 2 is preferably formed, at the periphery of the first electrode 1, with a plurality of conduits 60 for the passage of a refrigerant, for example water. The gas inlet 7 communicates with a homogenization chamber or plenum 9 formed in a housing 10 secured to the block 2 and comprising a supply tube 11 for gas at a pressure comprised between $0.3 \times 10^5$ Pa and $3 \times 10^5$ Pa, from a gas source 12. The electrodes 1 and 4 are connected to a high voltage high frequency electric generator 13 operating at a frequency higher than 15 kHz, the present technological limits being 60 kHz for a power of the order of 10 kW. The gaseous flow containing the excited species at the outlet 8 is sent to a utilization station 14 as will be seen further on.

In the embodiment of FIG. 2, there will be noted the dielectric tube 3, of a thickness of the order to 2 mm with its internal metallization 4 constituting the second electrode, the first electrode 1 being constituted here by a metallic tube comprising diametrically opposed slots forming the inlet 7 and the outlet 8. The first electrode 1 and the dielectric tube 3 are assembled to constitute a sealed coaxial assembly thanks to a first insulating end plug 15 and a second insulating end plug 16, the assembly being slidably sealingly introduced into a bore 17 of a parallelepipedal body 20 comprising an elongated inlet opening 18 into which opens the inlet 7, and an elongated outlet opening 19 into which opens the outlet 8 of the first electrode.

If the ceramic used for producing the dielectric tube 3 has excellent electrical properties suitable for the production of condensers, it generally has granular surfaces, even when they are polished, which give rise to decreased performance under corona charges. To correct this, according to one aspect of the invention, the external surface of the dielectric 3 is covered with a thin layer 21 of enamel, thinner than 100 microns, typically about 20 microns. On the other hand, if the intimate contact between the internal electrode and the dielectric 3 permits avoiding the formation of micro-discharges along this latter, even in the case of use of very high power specifically permitted by the dielectric couple 3—enamel 21, there are problems of strong local reinforcement of the electrical field at the ends of the internal electrode 4. To overcome this, according to the embodiment of FIG. 2, the internal electrode 4 is supplied by a central tubular conductor 22 connected to opposite ends of the electrode 4 by flexible metal contacts 23 of curved shape whose profile permits slow and continuous evolution of the equi-potential formed by the electrode 4 by avoiding electric discharge into the cooling fluid, the risk of this discharge being moreover considerably reduced by using as refrigerant a chlorofluorocarbon because of its strong electro-negative character. Thus, according to one aspect of the invention, the tubular conductor 22 passes through the second insulating plug 16 and is closed by a metallic block 24 forming the connector to the source 13, the plug 16 comprising a radial passage 25 opening into the conductor 22 and a second radial passage 26 opening into the internal chamber 6 to provide in this latter a cooling oil circulation. As a modification, the peak limiting means of the electric field at the ends of the high voltage electrode 4 can be provided by a thickening, preferably progressive, toward the interior of the end of the dielectric tube 3 or by the addition, between the end of the dielectric 3 and the opposite end of the first electrode 1, of a dielectric ring whose annular surfaces are enameled as is the dielectric tube 3 and whose periphery is preferably metallized.

Another modification of these electric field peak limiters is shown in FIG. 3, in the form of metallic guard rings 27 disposed in prolongation of the end of the high voltage electrode 4 and covered, like the end of the electrode 4, with an internal enamel layer 28 of the same type as the external enamel layer 21.

As mentioned above, the apparatus according to the invention can be used to create excited species of different gases.

If the gas introduced into the apparatus contains mostly nitrogen, typically with a content greater than 78% in a mixture containing typically oxygen, this apparatus creates essentially the nitrogen excited vibrationally, but also atomic nitrogen and molecular nitrogen excited at the level $A^3 \Sigma g^+$. The vibrationally excited nitrogen has two principal applications, namely $CO_2$ mixed power lasers, wherein the excited nitrogen is rapidly mixed with $CO_2$ to which it transfers its energy, thereby creating the necessary population inversion for the laser effect, and nitriding of metallic surfaces with limited heating of the metal. The nitrogen content plays an important role. The impurities $CO_2$, $CO$, $H_2$ and especially $H_2O$, which de-excite vibrational nitrogen, must be limited. In the presence of oxygen in the nitrogen, the production output falls roughly proportionally to the concentration of oxygen, for nitriding treatments, a nitrogen containing 5% oxygen, preferably obtained by permeation or adsorption, is a good compromise, to the extent to which the gas price is considerably lowered relative to that of pure nitrogen without substantially diminishing the output of excited species.

The apparatus according to the invention can be preferably used for the production of ozone from dry air or from pure oxygen. In the case of oxygen, the apparatus produces ozone, singlet oxygen and atomic oxygen. The respective quantities of these produced species depend on numerous parameters, particularly the temperature of the gas (depending on the flow rate of the gas for a given power) and the frequency of the electric generator. The temperature of the gas thus determines the degree of ultimate destruction of the ozone, and hence the evolution of atomic oxygen, and the frequency influences the energy of the electrons and thus the excitation and the dissociation of the molecular oxygen. In addition to uses for depollution and sterilization, the products thus generated are used to modify the surface properties of polymers, particularly their adhesive properties and wettability.

By supplying the apparatus with hydrogen or a hydrogen base mixture (for example hydrogen/argon), there are created atomic or excited species with very much reduced power which are used for example for cleaning.

Although the present invention has been described with respect to particular embodiments, it is not thereby limited but is on the contrary susceptible of modifications and variations which will become apparent to one skilled in the art.

What is claimed is:

1. In apparatus for the formation of excited or unstable gaseous molecules, comprising a tubular gas passage having an axis, formed between a first electrode and a dielectric tube coaxial to the first electrode and supporting a second electrode, the electrodes being connected to a high voltage high frequency source; the improvement wherein the first electrode surrounds the dielectric tube and comprises an elongated gas inlet and an elongated gas outlet, said inlet and outlet being substantially parallel to said axis and substantially diametrically opposed to each other on opposite sides of said dielectric tube, the second electrode being in the form of a layer applied to the internal wall of the dielectric tube.

2. Apparatus according to claim 1, wherein the second electrode is formed by metallization of the internal wall of the dielectric tube.

3. Apparatus according to claim 1, wherein the gas inlet and outlet each have a height not exceeding the radial thickness of the gas passage.

4. Apparatus according to claim 1, wherein the external wall of the dielectric tube is covered with a thin layer of enamel.

5. Apparatus according to claim 1, which further comprises electric field limiting means adjacent the axial ends of the second electrode to avoid the formation of microdischarges at the ends of the dielectric tube.

6. Apparatus according to claim 5, wherein the field limiting means comprise shaped contracts between the second electrode and a central conductor.

7. Apparatus according to claim 5, wherein the field limiting means comprise guard rings formed on the dielectric tube in axial prolongation of the second electrode.

8. Apparatus according to claim 1, which further comprises means to cause a refrigerant to circulate within the dielectric tube.

9. Apparatus according to claim 1, wherein the electrodes and the dielectric tube are in the form of cylindrical subassemblies inserted in a body comprising elongated passages for the inlet and outlet of gas.

10. Apparatus according to claim 1, wherein the radial thickness of the gas passage does not exceed 2.5 mm.

11. Apparatus according to claim 1, which further comprises a homogenization chamber between the inlet passage and a gas supply conduit connected to a source of gas.

* * * * *